(12) United States Patent
Bai

(10) Patent No.: US 10,606,147 B2
(45) Date of Patent: Mar. 31, 2020

(54) LENS DRIVING DEVICE

(71) Applicant: Nidec Copal Corporation, Tokyo (JP)

(72) Inventor: Longji Bai, Tokyo (JP)

(73) Assignee: Nidec Copal Corporation, Tokyo (JP)

(*) Notice: Subject to any disclaimer, the term of this patent is extended or adjusted under 35 U.S.C. 154(b) by 0 days.

(21) Appl. No.: 15/526,914

(22) PCT Filed: Oct. 22, 2015

(86) PCT No.: PCT/JP2015/079762
§ 371 (c)(1),
(2) Date: May 15, 2017

(87) PCT Pub. No.: WO2016/084523
PCT Pub. Date: Jun. 2, 2016

(65) Prior Publication Data
US 2017/0322476 A1     Nov. 9, 2017

(30) Foreign Application Priority Data

Nov. 28, 2014   (JP) ................................ 2014-242411

(51) Int. Cl.
*G03B 5/04*        (2006.01)
*G03B 13/36*     (2006.01)
(Continued)

(52) U.S. Cl.
CPC ................ *G03B 5/04* (2013.01); *G02B 7/04* (2013.01); *G02B 7/09* (2013.01); *G02B 27/646* (2013.01);
(Continued)

(58) Field of Classification Search
CPC .......... G02B 27/646; G02B 7/08; G02B 7/09; G02B 7/04; G02B 7/28; G02B 7/282;
(Continued)

(56) References Cited

U.S. PATENT DOCUMENTS 9,013,588 B2     4/2015   Moriya et al.
2012/0154614 A1   6/2012   Moriya et al.
(Continued)

FOREIGN PATENT DOCUMENTS

CN      102879973 A     1/2013
JP       2011-065140 A   3/2011
(Continued)

OTHER PUBLICATIONS

International Search Report (English and Japanese) and PCT Written Opinion (Japanese) dated Jan. 19, 2016 issued in corresponding PCT International Application No. PCT/JP2015/079762.

*Primary Examiner* — Marin Pichler
(74) *Attorney, Agent, or Firm* — Troutman Sanders LLP

(57) ABSTRACT

Disclosed is a lens driving device includes: a lens frame; a support frame that elastically supports the lens frame in the optical-axis direction through plate springs; a base support member that elastically supports the lens frame supported by the support frame, in a direction intersecting the optical axis, through support wires; and a driving unit that drives the lens frame in one or both of the optical-axis direction and the direction intersecting the optical axis. The plate springs include elastic arm sections, respectively, which project outward of a portion at which the support frame is attached; and wire attaching sections which are connected to the elastic arm sections, respectively. A connecting position at which the wire attaching section and the elastic arm section are attached to each other is disposed outward of a fixing position where the leading end portion of a corresponding one of the support wires is fixed to the wire attaching section.

6 Claims, 7 Drawing Sheets

(51) Int. Cl.
*G02B 27/64* (2006.01)
*G02B 7/09* (2006.01)
*G02B 7/04* (2006.01)
*G03B 3/10* (2006.01)
*G03B 5/02* (2006.01)
*G02B 13/00* (2006.01)

(52) U.S. Cl.
CPC .............. *G03B 3/10* (2013.01); *G03B 5/02* (2013.01); *G03B 13/36* (2013.01); *G02B 13/001* (2013.01); *G03B 2205/0015* (2013.01)

(58) Field of Classification Search
CPC .......... G02B 13/001; G03B 3/10; G03B 5/00; G03B 5/02; G03B 5/04; G03B 13/36; G03B 2205/0007; G03B 2205/0015; G03B 2205/0069; G03B 2205/0046; G03B 2205/0053; H04N 5/2253; H04N 5/2254; H04N 5/2328; H04N 5/23287; H04N 5/23212; H02K 41/0356

USPC ............................ 359/557, 824, 825; 396/55
See application file for complete search history.

(56) References Cited

U.S. PATENT DOCUMENTS

| | | |
|---|---|---|
| 2013/0016427 A1 | 1/2013 | Sugawara |
| 2015/0103195 A1* | 4/2015 | Kwon ................. H04N 5/2253 348/208.12 |
| 2015/0131153 A1 | 5/2015 | Wade et al. |
| 2017/0351159 A1* | 12/2017 | Kudo ...................... G02B 7/08 |

FOREIGN PATENT DOCUMENTS

| | | |
|---|---|---|
| JP | 2011113009 A | 6/2011 |
| JP | 201324938 A | 2/2013 |
| WO | 2011/062123 A1 | 5/2011 |

\* cited by examiner

LENS DRIVING DEVICE

CROSS-REFERENCE TO RELATED APPLICATIONS

This is a U.S. national phase application under 35 U.S.C. § 371 of International Patent Application No. PCT/JP2015/079762, filed Oct. 22, 2015, and claims benefit of priority to Japanese Patent Application No. 2014-242411, filed Nov. 28, 2014. The entire contents of these applications are hereby incorporated by reference.

FIELD OF TECHNOLOGY

The present invention relates to a lens driving device.

BACKGROUND

There is a known lens driving device provided with a driving portion of an electromagnetic driving type, made from a coil and the magnet. In this type of lens driving device, there is a driving device for the autofocus, which drives the lens frame along the optical axial direction, and a driving device for correcting camera shaking, which drives the lens frame in the directions that are perpendicular to the optical axis, where the camera that is disclosed in Japanese Unexamined Patent Application Publication No. 2011-65140, below, is provided with a combination of a driving device for autofocusing and a driving device for correcting camera shaking.

In this type of lens driving device, a lens frame is attached to a supporting member through an elastic supporting member such as a leaf spring, or the like, and the position of the lens frame is controlled to the location of the equilibrium between the thrust that is produced by a driving portion and the elastic force of the elastic supporting member. The prior art set forth in Japanese Unexamined Patent Application Publication No. 2011-65140 is a camera shake correcting device for correcting camera shaking through moving the entirety of the autofocus lens driving device in the X and Y directions that are perpendicular to each other and perpendicular to the optical axis, comprising a base that is disposed separated from a bottom face portion of the autofocus lens driving device, and a plurality of wires (suspension wires) having one end each secured at an outer peripheral portion of the base, and that extend along the optical axis, to support the entirety of the autofocus lens driving device so as to swing in the X direction and the Y direction.

SUMMARY

In the conventional lens driving device, the lens frame is supported elastically on a supporting member through a leaf spring, where end portions on one end of each wire are secured to the four corners of a leaf spring that is attached to the supporting member, with the other ends of the wires secured to a base supporting member. Because of this, the lens frame and the supporting member are supported in a state wherein they are suspended by the tip end portions of the wires.

In such a lens driving device, when an external force, such as a dropping impact, or the like, is applied, the supporting member that is supported in a suspended state approaches the base supporting member side with a large acceleration, with the risk that a buckling load will act on a wire. When this is handled through increasing the rigidity of the wires, there will be a problem in that this is difficult in that if the driving portion is made smaller due to the need for miniaturization and weight reduction of the lens driving device, the thrust will be reduced.

When the lens frame is moved in a direction that is perpendicular to the optical axis in order to correct camera shaking, the wires that elastically support the lens frame bend, of course, and at this time the lens frame cannot move in parallel to the optical axis, due to the rigidity of the wire that the location wherein the tip end portion and the leaf spring are secured, producing a problem in that the optical axis becomes tilted. This tilting of the optical axis produces a tilt to a degree in that the amount of movement in the direction that is perpendicular to the optical axis will be large.

In the present invention, the handling of such problems is an example of the problem to be solved. That is, the problems to be solved by the present invention are those of preventing buckling and damaging of the wires when there is a dropping impact, and preventing tilting of the optical axis when correcting camera shaking, to enable high accuracy lens driving.

In order to solve such a problem, the present invention is provided with the following structures:

A lens driving device comprising: a lens frame; a supporting frame for supporting the lens frame elastically in the optical axial direction through a leaf spring; a base supporting member for supporting elastically the lens frame, which is supported on the supporting frame, in a direction that is perpendicular to the optical axis, through a supporting wire; and a driving portion for driving the lens frame in the optical axial direction and in one or both directions that are perpendicular to the optical axis, wherein: the leaf spring comprises an elastic arm portion that is pulled to the outside by an attaching portion of the supporting frame, and a wire attaching portion that is connected to the elastic arm portion; and the connecting position of the wire attaching portion and the elastic arm portion is disposed to the outside of a securing position for securing a tip end portion of the supporting wire to the wire attaching portion.

The lens driving device according to the present invention, having such distinctive features, enables the prevention of buckling and damage to the wires at the time of a dropping impact, or the like, and enables highly accurate lens driving through preventing tilting of the optical axis when correcting camera shaking.

BRIEF DESCRIPTIONS OF THE DRAWINGS

DETAILED DESCRIPTION

Figure 1:
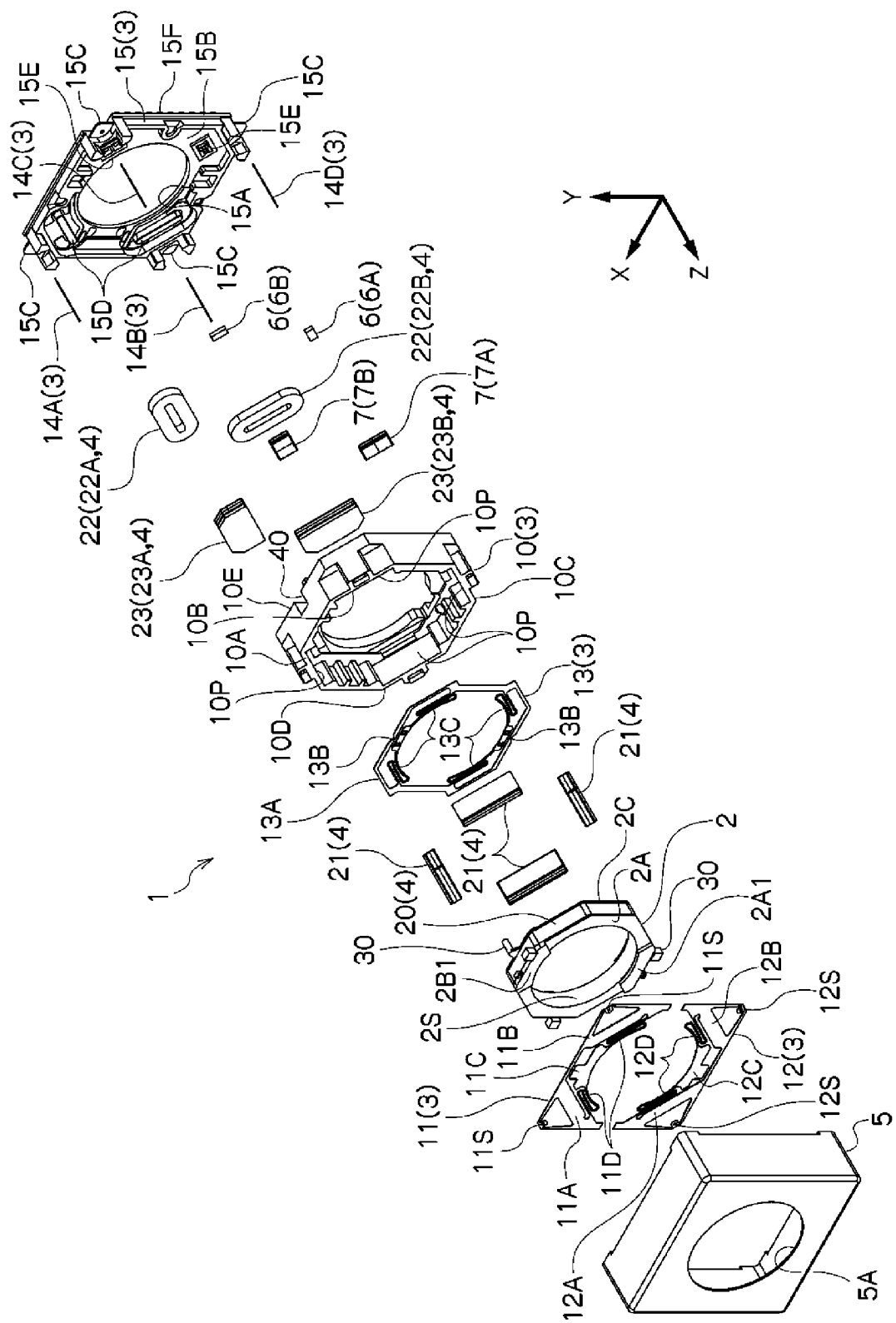
FIG. 1 is a cross-sectional diagram, when viewed from the optical axial direction, of a lens driving device according to an example according to the present invention.
Figure 2:
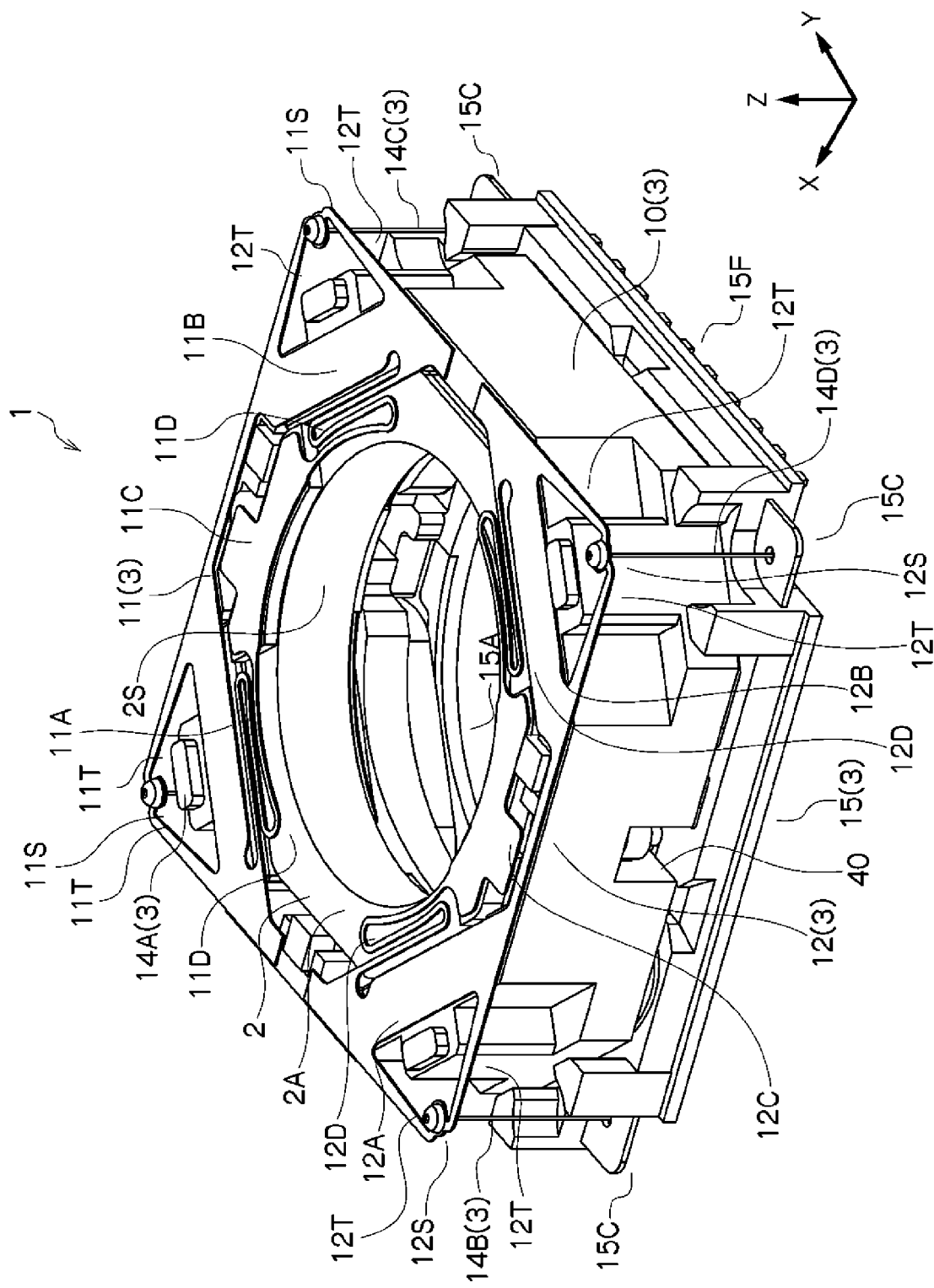
FIG. 2 is an overall perspective diagram of a lens driving device according to an example according to the present invention (in a state wherein the cover has been removed).
Figure 3:
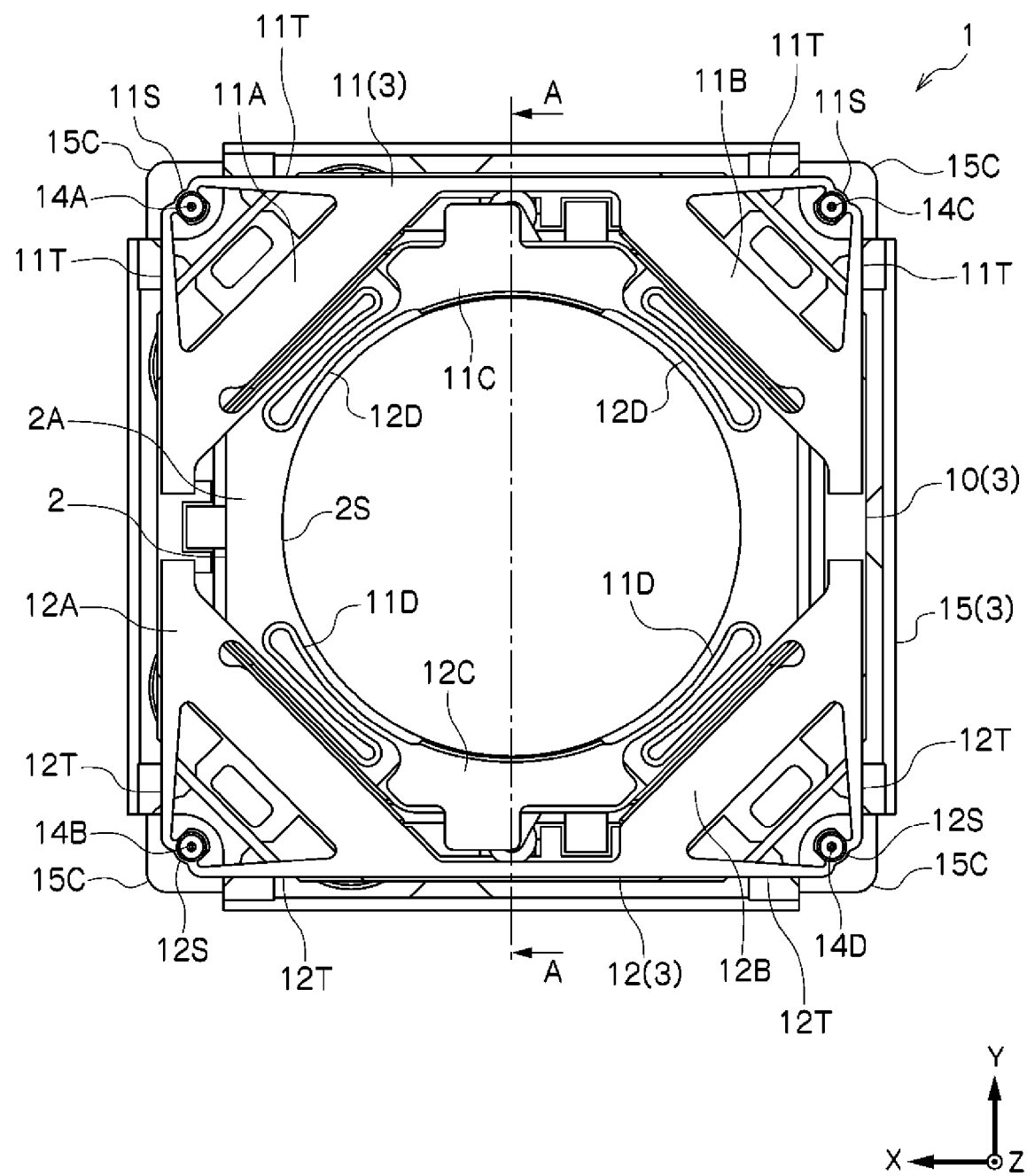
FIG. 3 is a plan view of a lens driving device according to an example according to the present invention.

An embodiment according to the present invention will be explained below in reference to the drawings. FIG. 1 through 3 illustrate the overall structure of a lens driving device according to an example according to the present invention. The lens driving device 1 includes a lens frame 2, a supporting portion 3, and a driving portion 4. The lens frame 2 is equipped with a lens barrel attaching opening 2S into which a lens barrel, not shown, is attached. The axis of the lens barrel attaching opening 2S is the optical axis of the lens. In the below, the explanation will treat the object side of the lens as the "front," and the image side of the lens as the "back." In the figures, the optical axial direction is shown as the Z direction, and the directions that are perpendicular to the optical axis are shown as the X and Y directions.

The driving portion 4 drives the lens frame 2 in the optical axial direction and in one or both of the directions that are perpendicular to the optical axis. The example in the figure illustrates an example that is provided with a driving portion for autofocusing, which drives in the optical axial direction, and a driving portion for camera shake correction, which drives the directions that are perpendicular to the optical axis. In the example in the figure, the driving portion 4 comprises a focusing coil 20 that is wound around the optical axis, on the outside surface of the lens frame 2, four focusing magnets 21 that are disposed on the periphery of the lens frame 2, two camera shake correcting magnets 23 (23A and 23B) wherein the directions of the magnetic fields are perpendicular in the X-Y directions, and respective camera shake correcting coils 22 (22A and 22B) that are disposed respectively therebehind.

The supporting portion 3 elastically supports the lens frame 2 in the direction of driving of the driving portion 4. The position of the lens frame 2 is controlled by the equilibrium of the thrust of the driving portion 4 and the elastic force of the supporting portion 3. The supporting portion 3 is equipped with a supporting frame (a movable supporting frame) 10 that is disposed to the outside of the lens frame 2, and a base supporting member 15 that is disposed to the rear of the lens frame 2. The supporting frame 10 elastically supports, in the optical axial direction, the lens frame 2 through leaf springs (front side leaf springs 11 and 12 and back side leaf spring 13), and the base supporting member 15 elastically supports, in the directions that are perpendicular to the optical axis, the lens frame 2 that is supported on the supporting frame 10, through a plurality of supporting wires 14A, 14B, 14C, and 14D, that are disposed along the optical axial direction. The supporting frame 10 is of a rectangular shape that surrounds the lens frame 2 around the optical axis, where the corner portions serve as magnet holding portions 10P for holding the focusing magnets 21, described above.

Outer attaching portions 11A and 11B of the front side leaf spring 11 are attached to front end attaching portions 10A and 10B of the supporting frame 10, and an inner attaching portion 11C of the front side leaf spring 11 is attached to the front side attaching portion 2A1 that is attached to the front face 2A of the lens frame 2. Outer attaching portions 12B and 12A of the front side leaf spring 12 are attached to front end attaching portions 10C and 10D of the supporting frame 10, and an inner attaching portion 12C of the front side leaf spring 12 is attached to the front side attaching portion 2A1 that is provided on the front face 2A of the lens frame 2.

In the front side leaf spring 11, an elastic portion 11D is provided between the outer attaching portions 11A and 11B and the inner attaching portion 11C, and, similarly, in the front side leaf spring 12, an elastic portion 12D is provided between the outer attaching portions 12A and 12B, and the inner attaching portion 12C.

An outer attaching portion 13A of the back side leaf spring 13 is attached to a back end attaching portion 10E of the supporting frame 10, and an inner attaching portion 13B of the back side leaf spring 13 is attached to a back side attaching portion 2C that is provided on the back face of the lens frame 2. In the back side leaf spring 13, an elastic portion 13C is provided between the outer attaching portion 13A and the inner attaching portion 13B.

The front side of the lens frame 2 is supported on the front side of the supporting frame 10 through the front side leaf springs 11 and 12, which are provided with the elastic portions 11D and 12D, and the back side of the lens frame 2 is supported on the back side of the supporting frame 10 through the back side leaf spring 13 that is provided with the elastic portion 13C. Through this, the lens frame 2 is supported elastically on the supporting frame 10 in regards to driving in the optical axial direction.

The base supporting member 15 is disposed on the back side of the lens frame 2 and the supporting frame 10, and is provided with a center opening portion 15A through which light that has passed through a lens of a bottom plate 15B passes. In the example in the figure, in the same manner as with the supporting frame 10, the base supporting member 15 has a rectangular shape that has corner portions, around the optical axis, with wire holding portions 15C provided in the corner portions.

Supporting wires 14A through 14D have elasticity in relation to bending, with the back ends thereof held in wire holding portions 15C of the base supporting member 15, provided extending along the optical axis. Additionally, the tip end portions of the supporting wires 14A through 14D are secured to wire attaching portions 11S and 12S that protrude respectively to the outside from the outer attaching portions 11A, 12A, 11B, and 12B of the front side leaf springs 11 and 12 that are attached to the supporting frame 10, where the supporting wires 14A through 14D support, in a suspended state, the supporting frame 10 that supports the lens frame 2 elastically. Through this, the lens frame 2 is supported elastically, relative to the driving directions that are perpendicular to the optical axis, through elastic bending of the supporting wires 14A through 14D.

The base supporting member 15 is provided with an external connecting terminal 15F, wherein a circuit for connecting the external connecting terminal 15F is provided on the bottom plate 15B, to structure a terminal portion for supplying power to the driving portion 4. Portions of the external connecting terminal 15F, which has a plurality of individual terminals, are connected to both ends of the camera shake correcting coils 22 (22A and 22B) that are supported in the coil supporting portion 15D of the base supporting member 15 through the circuit that is provided on the bottom plate 15B, to the terminals for supplying power to the camera shake correcting coils 22.

Other portions of the external connecting terminal 15F are connected to both ends of the focusing coil 20 through the front side leaf springs 11 and 12 and the supporting wires 14A and 14B that are held in the wire holding portion 15C, from the circuit that is provided on the bottom plate 15B, to be a terminal for supplying power to the focusing coil 20.

Moreover, other portions of the external connecting terminal 15F are connected to position detecting sensors 6 (or 6A and 6B) that are supported on a sensor supporting portion 15E of the base supporting member 15, through the circuit that is provided on the bottom plate 15B, to the input/output terminals for the position detecting sensors 6 (6A and 6B). The position detecting sensors 6 (6A and 6B) may use Hall sensors (magnetism sensors), and magnets 7 (7A and 7B) for position detection are provided on the supporting frame 10 so as to face the position detecting sensors 6.

It is possible to carry out the independent focusing control and camera shake correcting control for the lens frame 2 by controlling the supplies of power to the focusing coil 20 and to the camera shake correcting coils 22 each independently. At this time, feedback control, using the detection signals from the position detecting sensors 6 (6A and 6B) is carried out in the camera shake correcting control. A filter frame (not shown), for example, is equipped behind the base supporting member 15, and an imaging element is equipped behind that. Moreover, a cover 5 that is provided with a center opening 5A is installed on the base supporting member 15 so as to encompass the outer periphery of the supporting frame 10.

Figure 4A:
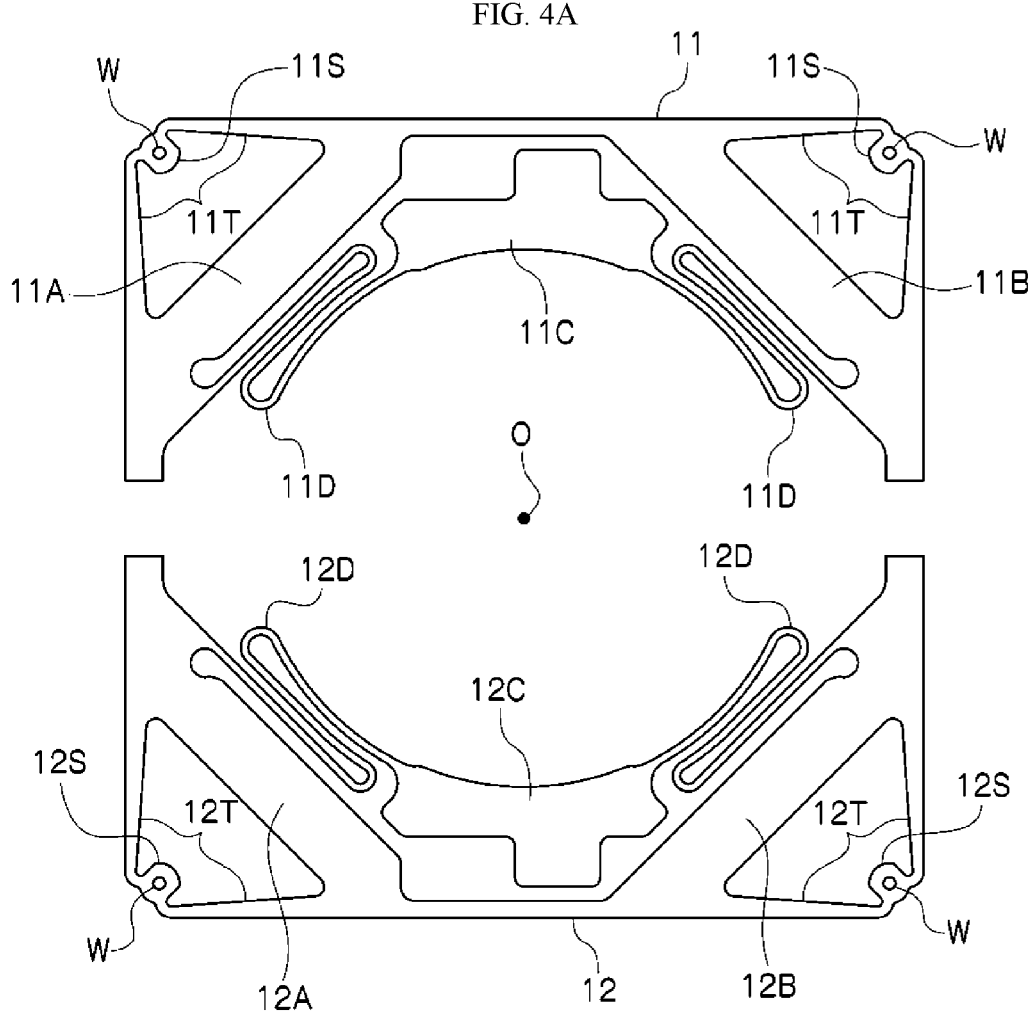
FIG. 4A is an overall plan view illustrating a front side leaf spring of a lens driving device according to an example according to the present invention.
Figure 4B:
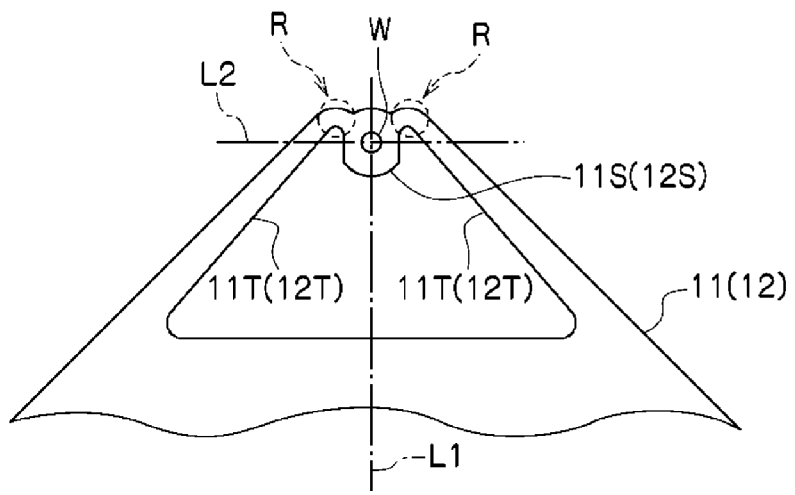
FIG. 4B is a partial plan view illustrating a front side leaf spring of a lens driving device according to an example according to the present invention.

FIG. 4 illustrates the front side leaf springs 11 and 12 (wherein (a) is an overall plan view and (b) is a partial plan view). The front side leaf springs 11 and 12 comprise elastic arm portions 11T and 12T that are pulled to the outside by attaching portions of the supporting frame 10, where wire attaching portions 11S and 12S, and are connected respectively to the elastic arm portions 11T and 12T. The elastic arm portions 11T and 12T are provided in pairs on the left and right of the wire attaching portions 11S and 12S, and are connected at connecting positions R that are provided at two locations each.

Given this, the connecting positions R of the wire attaching portions 11S and 12S and the elastic arm portions 11T and 12T are disposed to the outside of securing positions W wherein the tip end portions of the supporting wires 14A through 14D are secured to the wire attaching portions 11S and 12S. In the figure, the line L1 is an imaginary line connecting a securing position W and the optical axis O, where the line L2 is an imaginary line that passes through the securing position W, perpendicular to the line L1, and the connecting positions R, described above, are disposed to the outside of the line L2 (on the side opposite from the optical axis side).

Moreover, the elastic arm portions 11T and 12T and the wire attaching portions 11S and 12S are disposed at axially symmetrical positions around the optical axis O. In the example in the figure, the elastic arm portions 11T and 12T and the wire attaching portions 11S and 12S are disposed in four directions around the optical axis O.

Figure 5A:
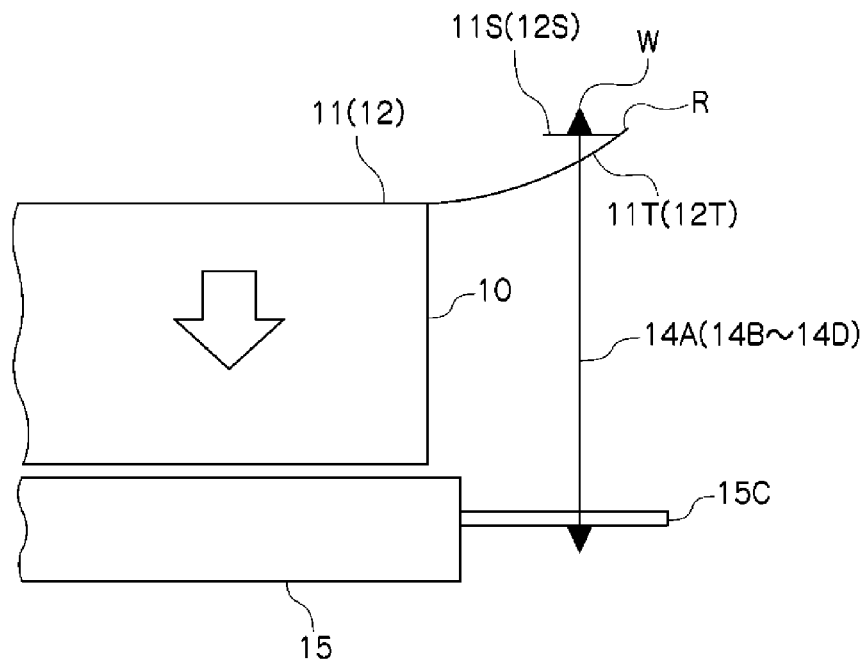
FIG. 5A is an explanatory diagram illustrating the deformed state of the front side leaf spring according to an example according the present invention.

With the lens driving device 1 that is provided with such front side leaf springs 11 and 12, as illustrated in FIG. 5A, even when a large load acts on the supporting frame 10 in the direction of the arrow, an angular dislocation is produced between both portions of the connecting positions R between the wire attaching portions 11S and 12S and the elastic arm portions 11T and 12T, so that the wire attaching portions 11S and 12S that are supported by the supporting wires 14A through 14D will maintain the horizontal state. Through this, bending of the supporting wires 14A through 14D is suppressed extremely, making it possible to prevent buckling and damage of the supporting wires 14A through 14D in relation to dropping impacts, and the like.

Figure 5B:
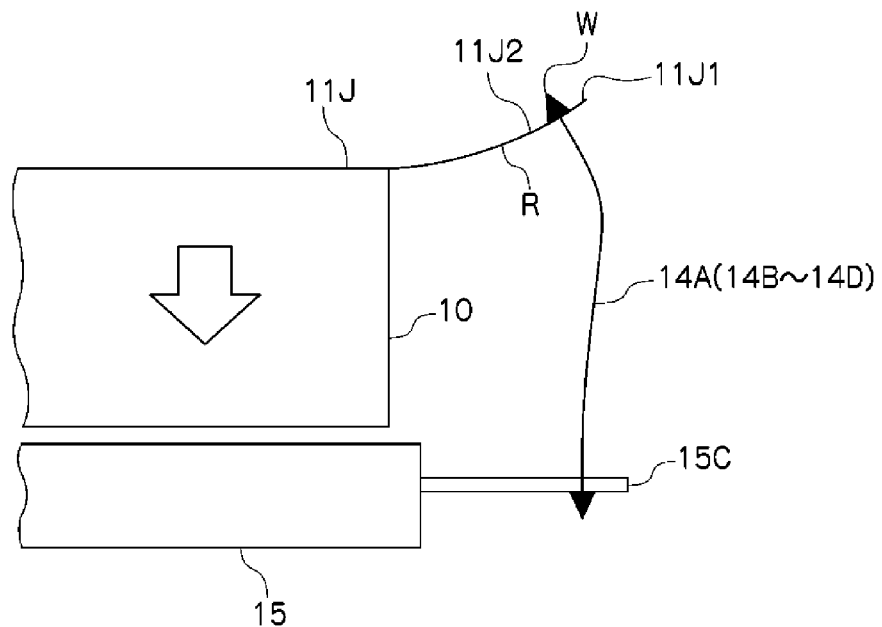
FIG. 5B is an explanatory diagram illustrating the deformed state of the front side leaf spring according to an example according the prior art.

In contrast, in the leaf spring 11J, such as in the prior art that is illustrated in FIG. 5B, when the connecting positions R of the wire attaching portion 11J1 and the elastic arm portion 11J2 are arranged to the inside of the securing positions W, wherein the tip end portions of the supporting wires 14A through 14D are secured to the wire attaching portion 11J1, the wire attaching portion 11J1 would be tilted by the dislocation of the supporting frame 10 in the direction of the arrow, which would produce a state wherein the supporting wires 14A through 14D tend to buckle, and are damaged easily through bending.

Moreover, a lens driving device 1 according to an example according to the present invention is structured so that bending of the supporting wires 14A through 14D is unlikely in relation to movements of the supporting frame 10 (the lens frame 2), making it possible to suppress tilting of the optical axis of the lens frame 2, even when the lens frame 2 is moved in a direction that is perpendicular to the optical axis through camera shake correction. This enables highly accurate lens driving.

Figure 6:
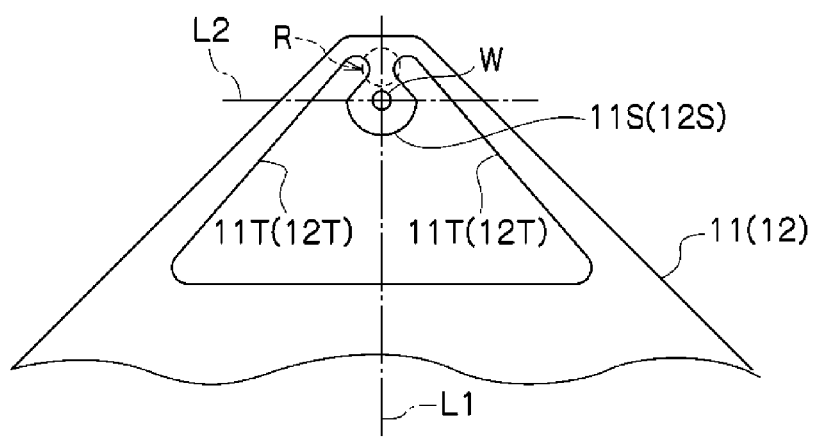
FIG. 6 is a partial plan view illustrating the front side leaf spring of a lens driving device according to another example according to the present invention.

FIG. 6 illustrates another example configuration of the front side leaf springs 11 and 12. Identical reference symbols are assigned to identical sites as in the example illustrated in FIGS. 4A-4B, and redundant explanations are omitted. In this example, the point that the connecting positions R for the wire attaching portions 11S (12S) and the elastic arm portions 11T (12T) are arranged further out than the securing positions W for securing the tip end portions of the supporting wires 14A through 14D to the wire attaching portions 11S (12S) is the same as in the example illustrated in FIG. 4B, but in contrast to the wire attaching portions 11S (12S) and the elastic arm portions 11T (12T) being connected at connecting positions R in two locations, in this example the wire attaching portion 11S (12S) and the elastic arm portion 11T (12T) are connected at a connecting position R at a single location.

In the example illustrated in FIG. 6, the single connecting position R wherein the wire attaching portion 11S (12S) and the elastic arm portion 11T (12T) are connected is disposed to the outside relative to the line L2 (the side that is opposite from the optical axial side) (where the line L1 is an imaginary line that connects the securing position W and the optical axis O, and the line L2 is an imaginary line that passes through the securing position W, perpendicular to the line L1). The left and right elastic arm portions 11T (12T) are integrated together at the tip end parts thereof, and a single connecting position R is provided at the part wherein they are connected together.

In the example illustrated in FIG. 6, the width of the connecting position R can be greater than the width of the tip ends of the elastic arm portions 11T (12T). The width of the tip ends of the elastic arm portion 11T (12T) must be set depending on the spring characteristics of the front side leaf spring 11 (12), and having the width of the connecting position R the greater than that relaxes the concentration of stresses at the connecting position R, enabling an increased connecting strength between the wire attaching portion 11S (12S) and the elastic arm portion 11T (12T) while preserving the desired spring characteristics. This enables improved durability of the front side leaf spring 11 (12). Moreover, through having the connecting position R be at a single location, this improves the component manufacturability of the front side leaf spring 11 (12).

The lens driving device 1 that is equipped with the front side leaf springs 11 and 12 having the connecting positions R, as illustrated in FIG. 6, also, in the same manner as in the example described above, produces angular dislocation between both of the connecting positions R of the wire attaching portions 11S and 12S and the elastic arm portions 11T and 12T when a large load acts on the supporting frame 10 in the arrow direction, as illustrated in FIG. 5A, so that the wire attaching portions 11S and 12S that are supported by the supporting wires 14A through 14D maintain the horizontal state. This can suppress extremely bending of the supporting wires 14A through 14D, enabling prevention of buckling and damage of the supporting wires 14A through 14D in respect to dropping impacts, and the like.

Figure 7A:
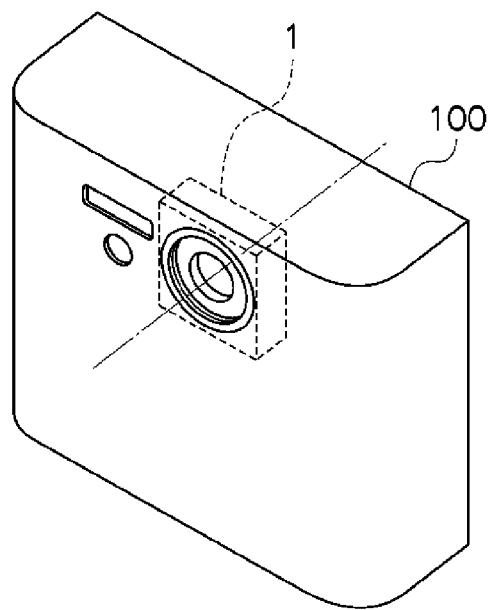
FIG. 7A is an explanatory diagram illustrating a camera equipped with the lens driving device according to examples according to the present invention.
Figure 7B:
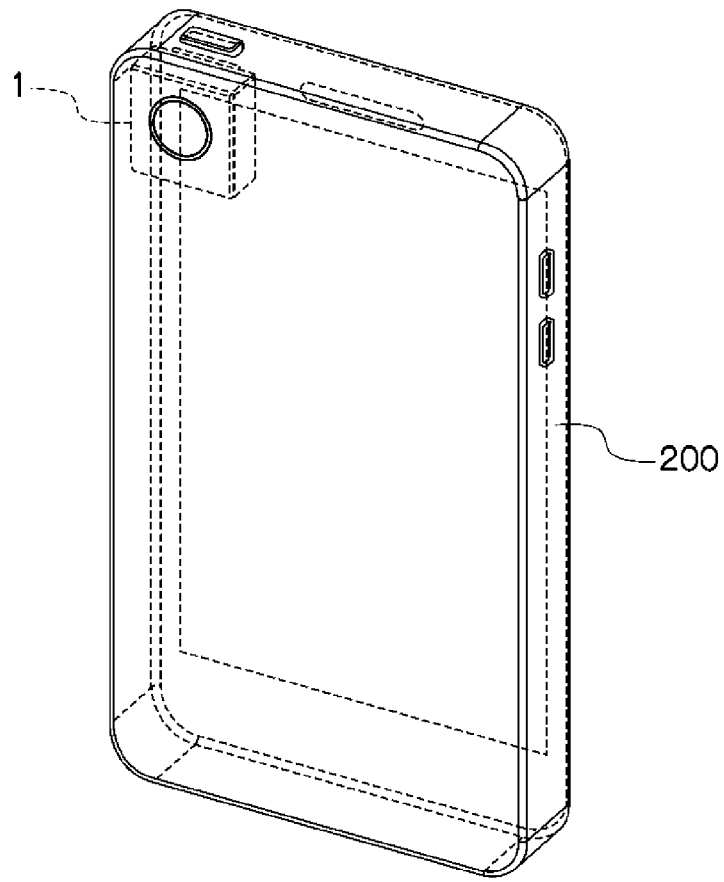
FIG. 7B is an explanatory diagram illustrating a mobile information terminal equipped with the lens driving device according to examples according to the present invention.

FIG. 7 illustrates electronic devices equipped with lens driving devices 1 according to examples according to the present invention. The lens driving device 1 according to an example according to the present invention being mounted in a camera 100, illustrated in FIG. 7A, not only enables miniaturization, but enables high autofocusing performance and camera shake correcting performance. Moreover, installation in the mobile information terminal 200 (such as a mobile telephone, a smart phone, or the like), illustrated in FIG. 7B, enables the device as a whole to be made thinner, and enables the camera function not part to have enhanced functionality with reduced space.

While examples according to the present invention were described in detail above, referencing the drawings, the specific structures thereof are not limited to these examples, but rather design variations within a range that does not deviate from the spirit and intent of the present invention are also included in the present invention. Moreover, insofar as there are no particular contradictions or problems in purposes or structures, or the like, the technologies of the various examples described above may be used together in combination.

The invention claimed is:

1. A lens driving device comprising:
   a lens frame;
   a supporting frame for supporting the lens frame elastically in the optical axial direction through a leaf spring;
   a base supporting member for supporting elastically the lens frame, which is supported on the supporting frame, in a direction that is perpendicular to the optical axis, through a supporting wire; and
   a driving portion for driving the lens frame in the optical axial direction and in one or both directions that are perpendicular to the optical axis, wherein:
      the leaf spring comprises an elastic arm portion that is pulled radially outward relative to the optical axis by a wire attaching portion that is connected to the elastic arm portion;
      the wire attaching portion and the elastic arm portion meets at a connecting position;
      a tip end portion of the supporting wire is secured to the wire attaching portion at a securing position;
      a first imaginary line connects the securing position and the optical axis;
      a second imaginary line passes through the securing position, perpendicular to the first imaginary line;
      the connecting position is disposed on a side of the second imaginary line opposite from the optical axis; and
      at least a portion of an inner side of the elastic arm portion is disposed on the side of the second imaginary line opposite from the optical axis.

2. The lens driving device as set forth in claim 1, wherein:
   the leaf spring comprises a front side leaf spring wherein the front side of the lens frame is supported on the front side of the supporting frame, and a back side leaf spring wherein the back side of the lens frame is supported on the back side of the supporting frame; and
   the elastic arm portion and the wire attaching portion are provided on the front side leaf spring.

3. The lens driving device as set forth in claim 2, wherein the leaf spring comprises a plurality of elastic arm portions connected to a plurality of wire attaching portions,
   in the front side leaf spring, the elastic arm portions and the wire attaching portions are arranged axially symmetrically around the optical axis.

4. The lens driving device as set forth in claim 1, wherein:
   the elastic arm portion has a pair of arms on the left and right of the wire attaching portion.

5. A camera comprising the lens driving device as set forth in claim 1.

6. A mobile electronic device comprising the lens driving device as set forth in claim 1.

* * * * *